Patented Aug. 4, 1925.

1,548,721

UNITED STATES PATENT OFFICE.

ARTHUR ROBERT LING AND DINSHAW RATTONJI NANJI, OF BIRMINGHAM, ENGLAND.

PROCESS OF TREATING STARCH AND MATERIALS CONTAINING STARCH.

No Drawing.  Application filed October 13, 1924. Serial No. 743,457.

*To all whom it may concern:*

Be it known that we, ARTHUR ROBERT LING and DINSHAW RATTONJI NANJI, both British subjects, and both of The University, Edmund Street, Birmingham, in the county of Warwick, England, have invented certain new and useful Improvements in Processes of Treating Starch and Materials Containing Starch, of which the following is a specification.

The object of the invention is to obtain a sugar product containing a large proportion of maltose and variable quantities of isomaltose, glucose, and dextrin, which is of value in confectionery and allied manufactures, by processes which can be readily worked commercially.

Various methods of treating starch are known by which it may be converted into material commercially known as dextrins through the agency of diastase contained in grain. Such "dextrin" products were of a low degree of saccharification with respect to the starch present, and would be useless for the purposes for which the products of our process are intended.

In the improved process starch paste is treated with an extract of ungerminated grain such as barley, until the major part of the starch present has been saccharified. At this stage a non-hygroscopic sugar suitable for use in confectionery is produced. If desired the process can be carried a step further and the substance can be treated either subsequently or simultaneously with an extract of germinated grain until it ceases to give a coloration with iodine, the time occupied depending on the degree of activity of the extract of germinated grain.

The effect of the treatment with the extract of germinated grain, or with an equivalent substance such as hereinafter specified, is to convert the amylopectin derivatives into an achroo-dextrin (i. e., one not giving a coloration with iodine) and ultimately also into maltose and isomaltose; the achroo-dextrin and isomaltose being unfermentable with ordinary yeast whereas the maltose is fermentable.

Such a mixture of maltose and amylopectin derivatives is a product useful in fermentation processes where for some purposes a partly unfermentable sweet substance is desired, but such a product has not been produced hitherto from starch in a commercially useful form.

Further the product for use in confectionery is of much greater utility than the so-called liquid glucose produced by the action of acids on starch, as it has a much higher sweetening value.

In place of the extracts we may use the dry grists from ungerminated and germinated grain or mixtures of both, or alternatively after the starch has been hydrolyzed by the diastase of ungerminated grain, giving a mixture of maltose and amylopectin derivatives, the latter may be further hydrolyzed to a mixture containing unfermentable isomaltose by an extract of animal pancreas or any other animal or vegetable extract containing similar enzymes.

The bio-chemical reactions in each case are similar and the final product is a mixture of maltose, isomaltose, dextrin, and glucose, the last two being present in relatively small quantities.

When dry grists from ungerminated and germinated grain are employed, the percentage of maltose which is converted into glucose is increased owing to the presence of the enzyme maltase in both germinated and ungerminated grain.

We give below one example of working directions for carrying out our invention.

25 parts or less by weight of the starch is mixed with 100 parts of water. The starch paste so produced is brought to a temperature of 50° C. and liquefied with a trace (about 1–2% of the mass of starch employed) of grist from low dried malt. After the mash has liquefied it is immediately brought to the boil with the addition of further 25 parts or less of starch. The mash is then cooled to 50° C. and finely ground barley grist from ungerminated grain added, the maximum quantity employed being 25–30% of the mass of starch used. The mash is kept at 50° C. under aseptic conditions until the action is complete.

The grist is filtered off at this stage and the filtrate decolorized and concentrated to the required density. The product is a non-hygroscopic sugar suitable for confectionery and allied manufactures.

Instead of filtering off at this stage the mash may be treated with a further 5% of malt grist (or with any other suitable enzyme from animal or vegetable sources as above specified), the percentage depending on the amount of starch present originally, at a temperature varying from 50° to 70° C. until the colour reaction with iodine fails to take place. Filtration and concentration is then carried out and the product is a mixture of maltose, isomaltose, achroo-dextrin, and glucose useful in fermentation processes.

We claim:—

1. A process of treating amylaceous materials consisting in liquefying starch paste with malt diastase, boiling the mash, cooling it and treating it at a temperature of approximately 50 degrees C. with a diastase of ungerminated grain until the greater part of the starch content has been saccharified.

2. A process of treating amylaceous materials consisting in producing a starch paste, heating the paste to a temperature approximately 50 degrees C., and liquefying it with a trace of the diastase of malt in the form of grist from low dried malt, bringing the mash to the boil with the addition of a further amount of starch, cooling the mash to 50 degrees C., and treating it at that temperature with a diastase of ungerminated grain in the form of barley grist (not exceeding 30% of the mass of starch used) under aseptic conditions, until the greater part of the starch content has been saccharified.

3. A process of treating amylaceous materials to convert the amylopectin content to an achroo-dextrin and isomaltose, consisting in treating starch paste with diastase of ungerminated grain and with a substance containing a suitable enzyme, such as that of germinated grain, until it ceases to give a colour reaction with iodine, and yields a product which is a partly unfermentable sugar consisting of maltose and in addition isomaltose, glucose and dextrin.

4. A process of treating amylaceous materials as in claim 1, wherein the dry grists from ungerminated grain are employed r the saccharifying agents.

5. A process of treating amylaceous materials as in claim 4, wherein the dry grists from ungerminated and germinated grain are employed as the saccharifying agents.

6. An improved product comprising a mixture of a large proportion of maltose and in addition isomaltose, glucose, and dextrin, which is produced by treating amylaceous materials with diastase of ungerminated, and subsequently of germinated, grain, until the greater part of the starch has been saccharified.

In testimony whereof we affix our signatures.

ARTHUR ROBERT LING.
DINSHAW RATTONJI NANJI.